United States Patent [19]
Williams

[11] Patent Number: 5,865,299
[45] Date of Patent: Feb. 2, 1999

[54] AIR CUSHIONED BELT CONVEYOR

[76] Inventor: Keith Williams, 1078 Greenwood Cut-off Rd., Weatherford, Tex. 76088

[21] Appl. No.: 911,627

[22] Filed: Aug. 15, 1997

[51] Int. Cl.$^6$ .................................................. B65G 15/60
[52] U.S. Cl. ............................................................ 198/811
[58] Field of Search ................................. 198/811, 689.1

[56] References Cited

U.S. PATENT DOCUMENTS

| 3,756,380 | 9/1973 | Ackroyd et al. | 198/811 |
| 4,316,718 | 2/1982 | Drugge | 198/811 X |
| 4,645,069 | 2/1987 | Sjogren | 198/811 X |

FOREIGN PATENT DOCUMENTS

| 664945 | 4/1988 | Switzerland | 198/811 |
| 689963 | 4/1953 | United Kingdom | 198/811 |

*Primary Examiner*—James R. Bidwell
*Attorney, Agent, or Firm*—Kenneth Jack

[57] ABSTRACT

A material conveyor consisting of a belt supporting floor having a multiplicity of air cushion apertures therethrough, a walled chamber attached to the material conveyor, the upper wall of the walled chamber consisting of the belt supporting floor, the walled chamber having a plurality of partitions there across dividing the chamber into segmented air pressure control chambers; a branched air induction tube attached to the material conveyor such tube being capable of injecting pressurized air into the air pressure control chambers; a conveyor belt mounted on the material conveyor so that its interior surface is in contact with the belt supporting floor; and a belt driving motor capable of driving the conveyor belt.

27 Claims, 10 Drawing Sheets

AIR CUSHIONED BELT CONVEYOR

FIELD OF THE INVENTION

This invention relates to continuous loop belt conveying belt systems. More particularly, this invention relates to air cushion assisted belt conveying systems.

BACKGROUND OF THE INVENTION

A basic conveyor belt system comprises a continuous loop conveyor belt typically composed of nylon cord reinforced styrene-butadine rubber, a forward roller, a rearward roller, a belt supporting floor and a roller driving electric motor. For short span conveyors, the interior surface of the belt simply glides over the smooth upper surface of the belt supporting floor. As belt conveyor systems are lengthened, sliding friction between the conveyor belt supporting floor and the interior surface or undersurface of the belt becomes excessive. A known method of reducing sliding friction between the belt supporting floor and the conveyor belt provides a multiplicity of parallel rollers forming a belt supporting floor. Utilization of such rollers as a floor surface transfers the point of frictional contact from the interior surface of the belt to ball bearings nested within each roller. Upon further lengthening of conveying systems, friction within such roller bearings will still rise to an unacceptably high level. Constructing a floor of rollers is also excessively expensive and difficult to maintain.

A method of still further reducing friction between the interior surface of a conveyor belt and its belt supporting floor provides for disposition therebetween of pressurized air, causing the under surface of the conveyor belt to glide over an air cushion rather than coming into frictional contact with the belt supporting floor. Such an air cushion may be created by utilizing a belt supporting floor as an upper wall of an elongated chamber of pressurized air; the pressurized air passing upwardly through the belt supporting floor through a multiplicity of apertures, creating the cushion of air between the upper surface of the belt supporting floor and the under surface of the belt.

Where bulky material such as grain is conveyed by an air cushioned conveying system, a high level of air pressure beneath the belt must be maintained in order to keep the material from pressing the belt downward onto the belt supporting floor. Thus, it is desireable to maintain high levels of air pressure along the length of loaded sections of an air cushioned conveyor belt system. It is undesirable to maintain such high air pressures along the lengths of unloaded sections of such systems. Where high air pressure is maintained beneath an unloaded section of an air cushioned conveyor belt, the belt tends to balloon upward, causing the belt to flutter. Undesirable upwelling and fluttering of the belt pulls the belt from under belt edge guide flanges, and may cause the belt to foul and jam.

The instant inventive air cushioned belt conveyor solves the problem of undesirable ballooning of the belt along unloaded sections by providing means of selectively controlling air pressure along the length of the conveyor belt.

PRIOR ART PATENTS

U.S. Pat. No. 3,734,270 issued May 22, 1973, to Foody discloses a belt conveyor having air cushioned side rib supports.

U.S. Pat. No. 3,756,380 issued Sep. 4, 1973, to Ackroyd, et al., discloses an air cushioned belt conveyor having air jets controlled by ball bearing valves.

U.S. Pat. No. 3,889,801 issued Jun. 17, 1975, to Boyer discloses an air cushioned belt conveyor which utilizes packaging resting upon the upper surface of the belt as a valve means for controlling underlying air pressure.

U.S. Pat. No. 4,185,736 issued Jan. 29, 1980, to Jonkers discloses an air cushioned belt conveyor having a troughed floor.

U.S. Pat. No. 4,489,825 issued Dec. 25, 1984, to Gladish discloses a trough type air cushioned belt conveyor utilizing a deformable tubular pallet.

U.S. Pat. No. 4,674,626 issued Jun. 23, 1987, to Adcock discloses an air cushioned belt conveyor having means for sealing the end rollers against air leakage.

U.S. Pat. No. 4,819,970 issued Apr. 11, 1989, to Adcock discloses an air cushioned belt conveyor having means for air sealing the end rollers against air leakage.

None of the above disclosed patents teaches, describes or discloses the novel, inventive, useful and unique aspects and features of the present inventive air cushioned belt conveyor.

SUMMARY OF THE INVENTION

The instant inventive air cushioned belt conveyor comprises an elongated belt supporting floor, the belt supporting floor having a multiplicity of apertures therethrough positioned along the length thereof, for the passage of air. The belt supporting floor forms an upper wall of an underlying air chamber, the air chamber being internally divided into segments along its length by partitioning walls; each such segment having an air induction port for receipt of pressurized air. Immediately below the air chamber underlying the belt supporting floor is mounted a belt return floor, such floor similarly having a multiplicity of apertures therethrough. The belt return floor similarly forms an upper wall of a second unpartitioned air chamber. Rollers are rotatably mounted at the forward and rearward ends of the conveyor system, and a flexible elastomeric continuous loop conveyor belt is installed over the rollers so that the belt extends first over the full length of the upper belt supporting floor, thence around the forward rollers, thence along the length of the underlying belt return floor, and thence around the rearward rollers to re-emerge in a continuous loop over the belt supporting floor.

Pressurized air is preferably provided by an electric motor driven air blower whose output end is attached to the input end of an air line. The output end of the air line is branched, having a plurality of output ends, the output ends leading to and being fixedly attached to the air induction ports of the upper air chamber segments, and the lower unsegmented air chamber. The output ends of the air line serving the air chamber segments optionally have regulated air flow provided by electric solenoid controlled air valves. Such air valves, when utilized, are preferably remotely actuatable for selective control of air pressure within the various air chamber segments along the length of the conveyor.

The belt conveyor, when configured for conveyance of packages or similar articles, preferably has no side walls or ceiling. The belt conveyor when configured for conveyance of bulk produce such as grain preferably has a pair of opposing side walls which extend upwardly from the left and right edges of the belt supporting floor, and which extend downwardly, providing a means for suspending the belt return floor. Such configuration includes an upper wall spanning between the upper ends of the side walls, along the full length of the belt conveyor; the belt supporting floor, the side walls, and the upper wall, together forming a closed channel for conveying dry bulk material such as grain.

Along the side walls of the belt conveyor configured for carrying grain are a series of side discharge doorways or apertures, each such aperture being selectively opened and closed by an hinged side discharge door, such doors each being capable of pivotable motion. Upon pivoting motion of such a side discharge door, dry bulk material such as grain traveling along the upper surface of the belt is diverted by the door and is thereby discharged sideways out of the conveying channel. The side discharge doors are preferably actuated through rotation of an upwardly extending axle affixed to the door's hinge. Preferably, pneumatic cylinder or an electric motor controlled actuator arms are mounted upon the upper surface of the upper wall of the conveyor, the actuator arms applying alternate pushing and pulling forces to lever arms, which apply rotational torque to the axles, which in turn control the angular positions of the side discharge doors. Preferably, the side discharge door actuators and the optional air control valves are remotely controlled through electric wiring and switching.

The conveyor belt is preferably driven by an electric motor mounted at the forward end of the conveyor and mechanically linked for providing rotational torque to one of the forward rollers. Also, preferably, the electric motor is remotely operatable through electric wiring and switching.

In operation, where dry bulk material such as grain is conveyed by the belt conveyor and is to be discharged out of a side discharge door prior to reaching the forward end of the conveyor, a pressure differential exists between segmented air chambers underlying loaded sections of the conveyor and segmented air chambers underlying unloaded sections of the conveyor. At loaded sections of the conveyor, grain presses the belt downward, causing the air cushion gap between the undersurface of the belt and the upper surface of the floor to be only a small fraction of a centimeter. The small air cushion gap allows a high level of air pressure to build within the segmented chambers underlying the loaded sections. Along unloaded sections of the conveyor, the conveyor belt is allowed to curve slightly upward, creating a much larger air gap than the gap existing at loaded sections. The enlarged air gap beneath unloaded sections of the conveyor acts as a pressure relief, reducing air pressure within segmented chambers underlying the unloaded sections. The partitions spanning across the air chamber prevent such pressure relieving effect from significantly reducing air pressure within chambers underlying loaded sections of the conveyor. In the absence of such partitions creating the segmented chambers, the pressure relieving effect of the upward curvature of the conveyor belt reduces air pressure along both unloaded and loaded sections of the conveyor. Air pressure within an unsegmented chamber may be increased to provide air cushioned conveyance notwithstanding such pressure relief occurring at unloaded sections. However, such an increase typically causes excessive upward curvature at unloaded sections; resulting in fluttering and jamming of the belt. By utilizing segmented air chambers high air pressure beneath loaded sections of the conveyor may be maintained while relatively low air pressure at unloaded sections is simultaneously maintained.

Where heavy materials are conveyed upon a belt which is highly flexible along its lateral dimension, upward curvature of the belt along unloaded sections may become excessive notwithstanding utilization of a segmented air chamber. To control such excessive curvature, a series of air valves may be installed to control the flow of air into the air induction ports of the segmented air chambers. When such air valves are utilized, they preferably are of the type which are actuatable by electric solenoids; and such valves preferably are remotely operatable through electric wiring and switching.

Air pressure within the unsegmented chamber below the belt return floor is controlled through adjustment of the size of air induction apertures, the air pressure in such chamber preferably remaining constant along the full length of the conveyor.

Accordingly, it is an object of the present invention to provide an air cushioned belt conveyor having a segmented air chamber for selective control of air pressure along the length of the conveyor.

It is a further object of the present invention to provide such a conveyor, further having a lower air cushioned belt return floor.

It is a further object of the present invention to provide such a conveyor, further providing a plurality of side discharge doors and means for selectively opening and closing the side discharge doors.

It is a further object of the present invention to provide such a conveyor, further having a plurality of air control valves for selectively controlling air pressure along the length of the conveyor.

It is a further object of the present invention to provide such a conveyor, further having an electric wiring and switching system for remote electronic control of the side discharge doors and the air valves.

Other and further objects, benefits, and advantage of the present invention will become known and apparent to those skilled in the art upon review of the Detailed Description which follows, and upon review of the appended drawings.

DETAILED DESCRIPTION OF THE PREFERRED EMBODIMENT

Figure 1:
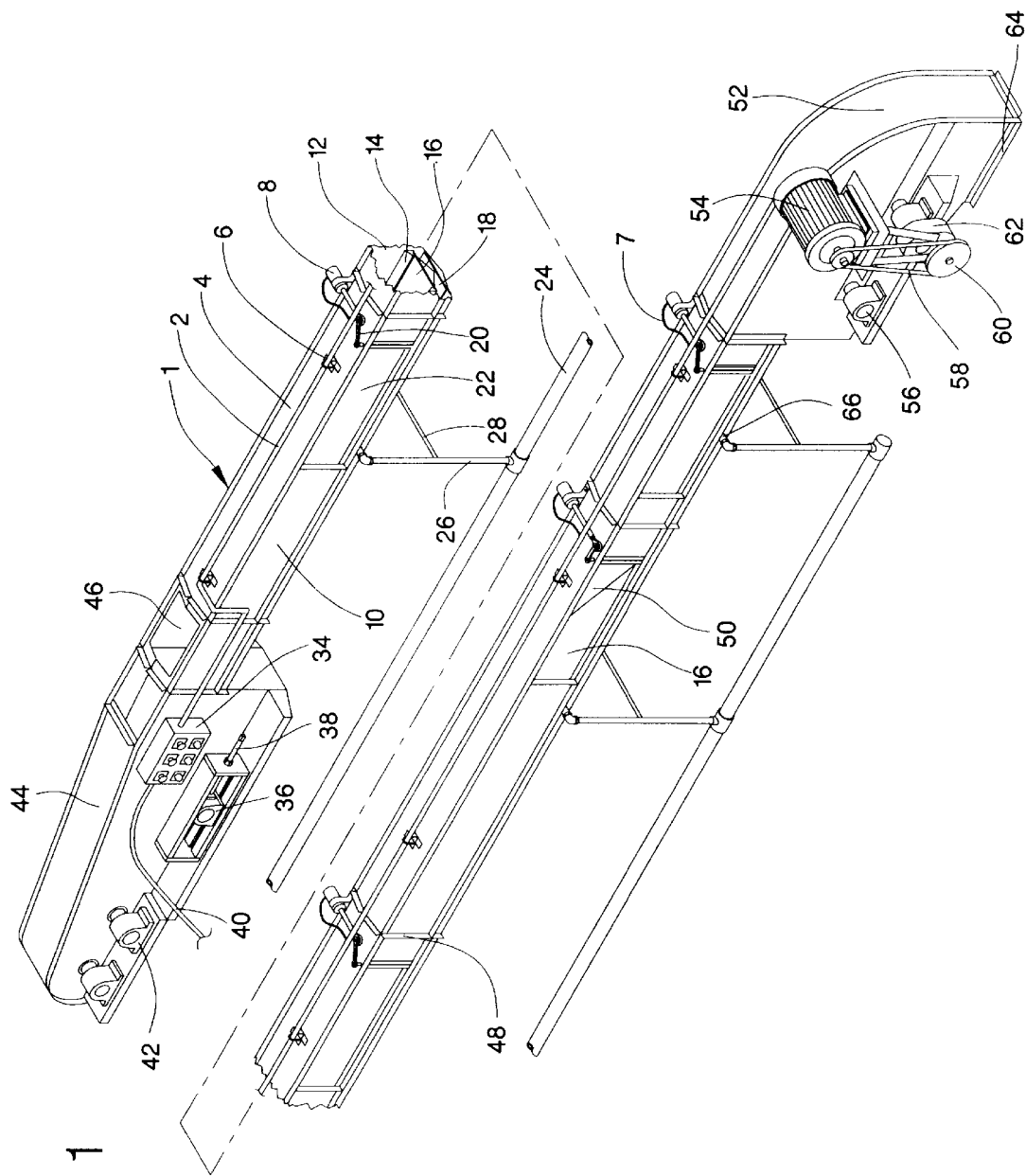
FIG. 1 is an isometric view of rearward and forward sections of the air cushioned belt conveyor.
Figure 2:
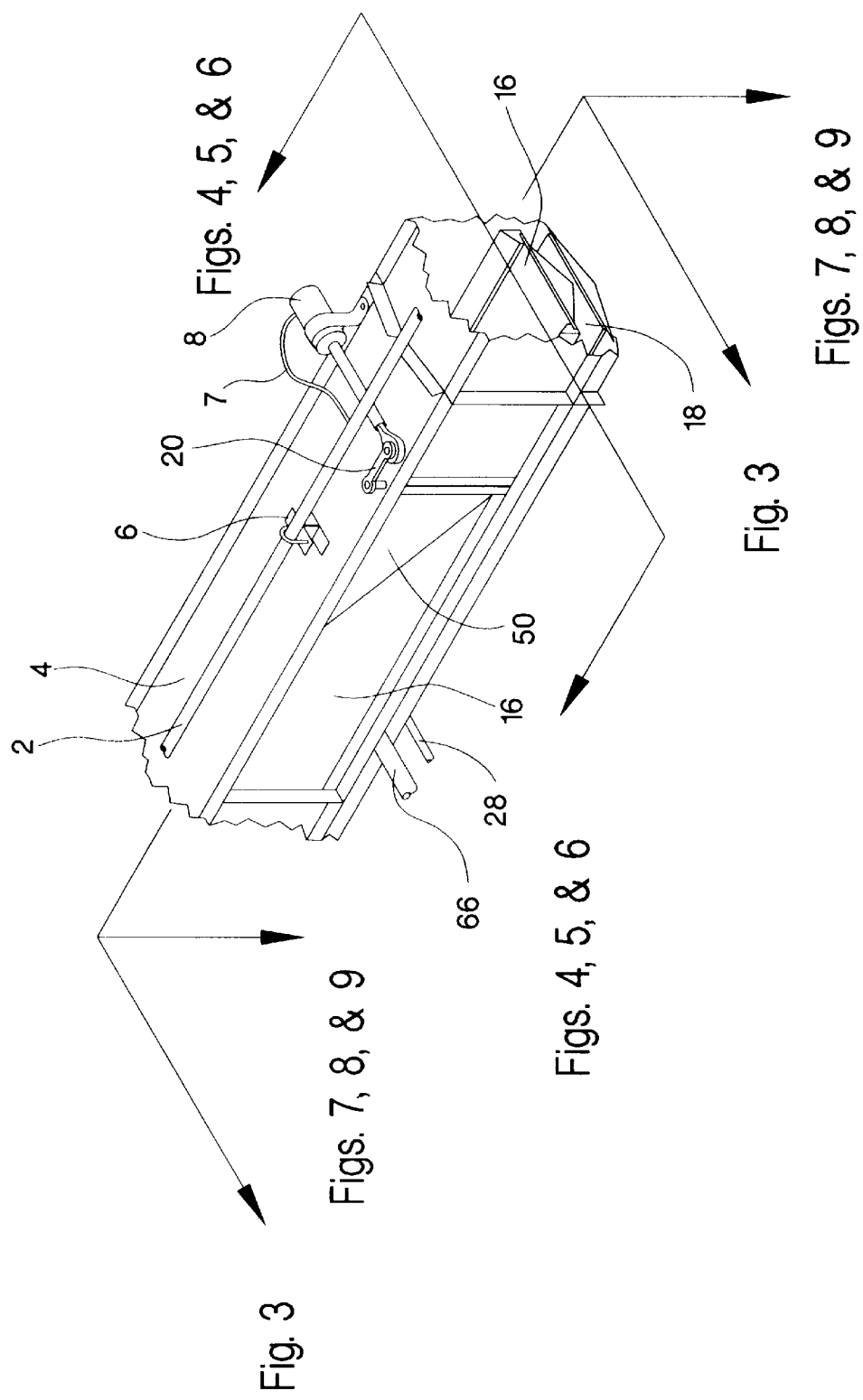
FIG. 2 is an isometric view of a broken segment of the air cushioned belt conveyor, including sectional viewing lines.

Referring now to the drawings, and in particular to FIG. 1, rearward and forward portions of the air cushioned belt conveyor 1, configured for conveyance of bulk material such as grain, are shown in an isometric view. In operation of a conveyor so configured, dry bulk materials such as grain is poured into the input port 46; the material then being conveyed forwardly on the upper surface of the forward path of the conveyor belt 16. The grain is then either discharged sideways by an open side discharge door 50, or ejected out of the forward output chute 64. Alternately, a combination of discharge points may be utilized simultaneously.

Figure 3:
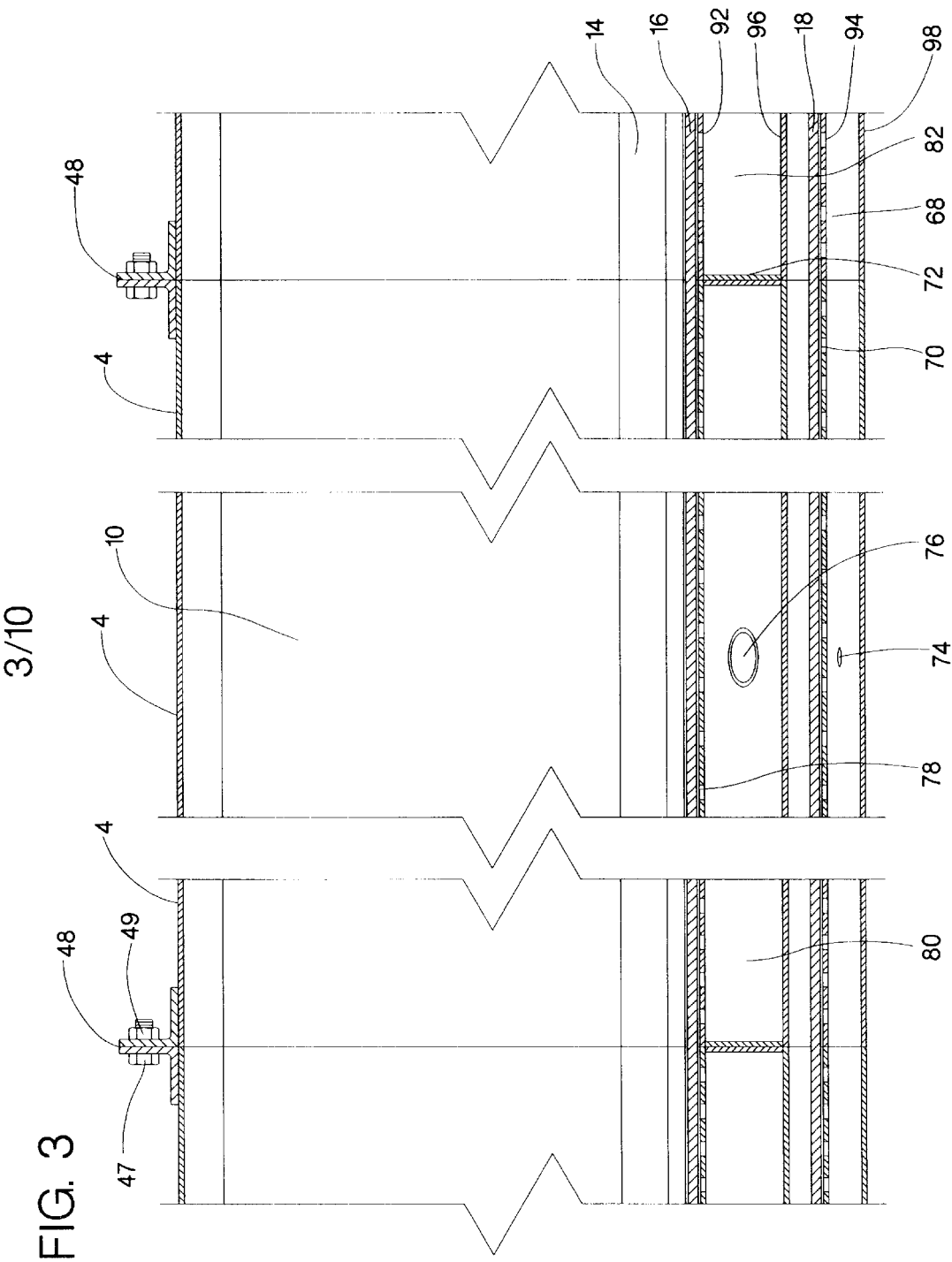
FIG. 3 is a side cutaway view of a section of the air cushioned belt conveyor, the plane of the section passing vertically along the longitudinal midline of the conveyor.
Figure 4:
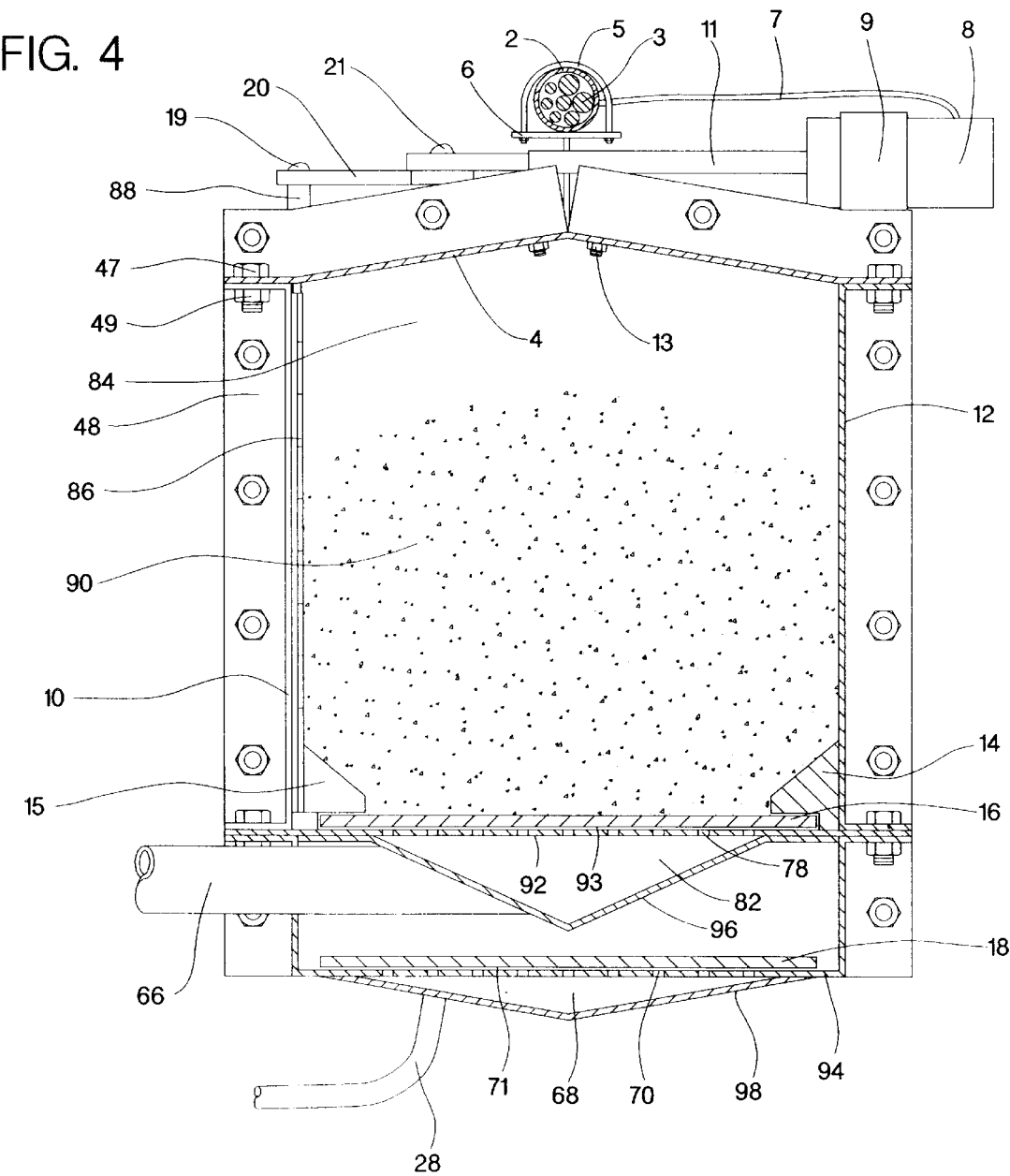
FIG. 4 is a sectional view of the air cushioned belt conveyor, the plane of the section passing laterally and vertically immediately downstream of one of the side discharge doors of the conveyor.
Figure 7:
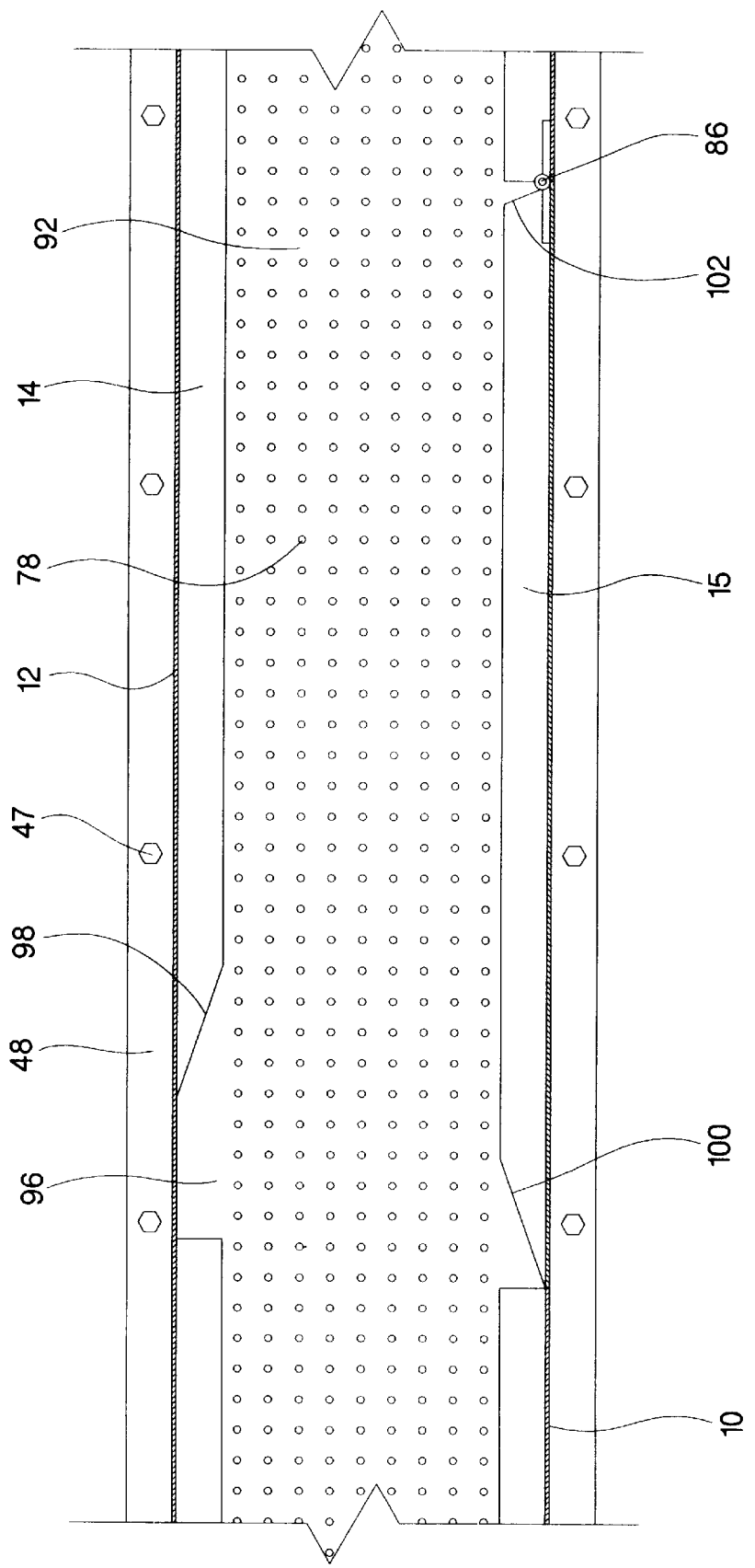
FIG. 7 is a sectional view from above of a section of the air cushioned belt conveyor, the plane of the cut passing horizontally through the midline of the conveyor.

Referring to FIG. 3, each segment of the belt conveyor is joined to the immediately preceding and immediately succeeding segment by apertured flanges 48, each flange being fixedly attached to an opposing flange by threaded bolts 47 and threaded nuts 49. Referring simultaneously to FIGS. 1 and 3, each segment of the conveyor has an upper wall 4 spanning between a pair of vertical side walls 10 and 12. Referring simultaneously to FIGS. 3 and 7, each segment of the conveyor has a belt supporting floor 92, the belt supporting floor 92 having a multiplicity of air cushion apertures 78 therethrough. Referring to FIG. 4, the combination of the upper wall 4, the opposing side walls 10 and 12, and the belt supporting floor 92 forms a channel 84 for the passage of dry bulk goods such as grain 90.

Referring to FIG. 3, each segment of the conveyor has an underlying segmented air chamber 80, each segmented air chamber 80 having forward and rearward partitioning walls 72, and a lower floor 96. Each segmented air chamber 80 also has an air induction port 76. Pressurized air flows in to the segmented air chambers 80 through the air induction ports 76; such air escaping upwardly through the air cushion apertures 78 to impinge upon and support the lower interior surface of the forward path of the conveyor belt 16.

Referring further to FIG. 3, suspended below the floor 96 of the segmented air chambers 80 is a belt return floor 94, the belt return floor 94 forming an upper wall of an unsegmented lower air chamber 68, such unsegmented chamber having a floor 98. Air injected into the lower air chamber 68 through air induction ports 74 passes upwardly out of the lower air chamber 68 through air cushion apertures 70 to impinge upon and support the exterior lower surface of the return path of the belt 18. Referring simultaneously to FIGS. 1 and 3, the air induction ports 76 and 74 are fed air through air induction tubes 66 and 28, each air induction tube 66 and 28, respectively feeding air into the segmented air chamber 80 and the unsegmented lower air chamber 68.

Figure 5:
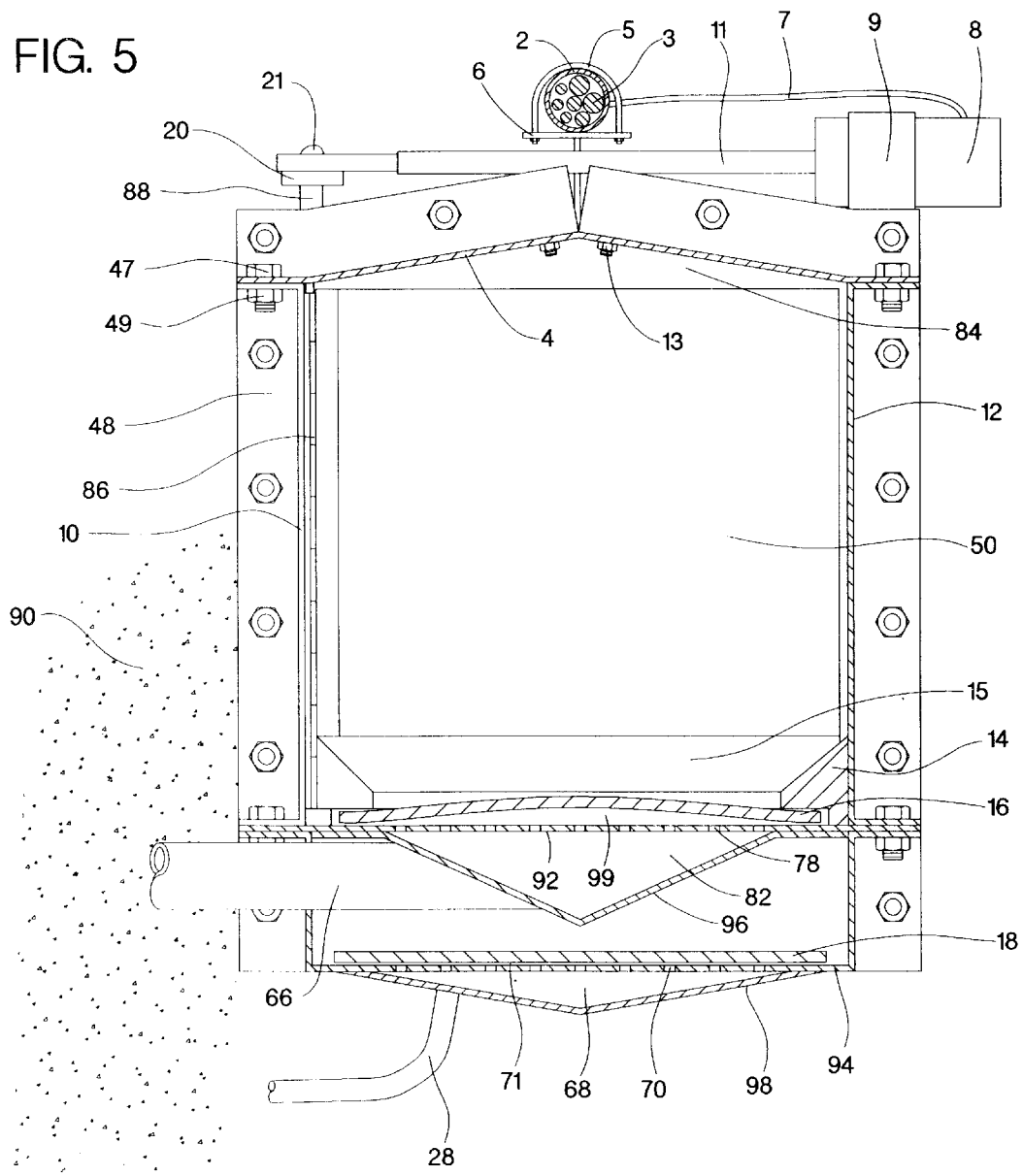
FIG. 5 is identical to FIG. 4, except showing an alternate side discharge door position.
Figure 8:
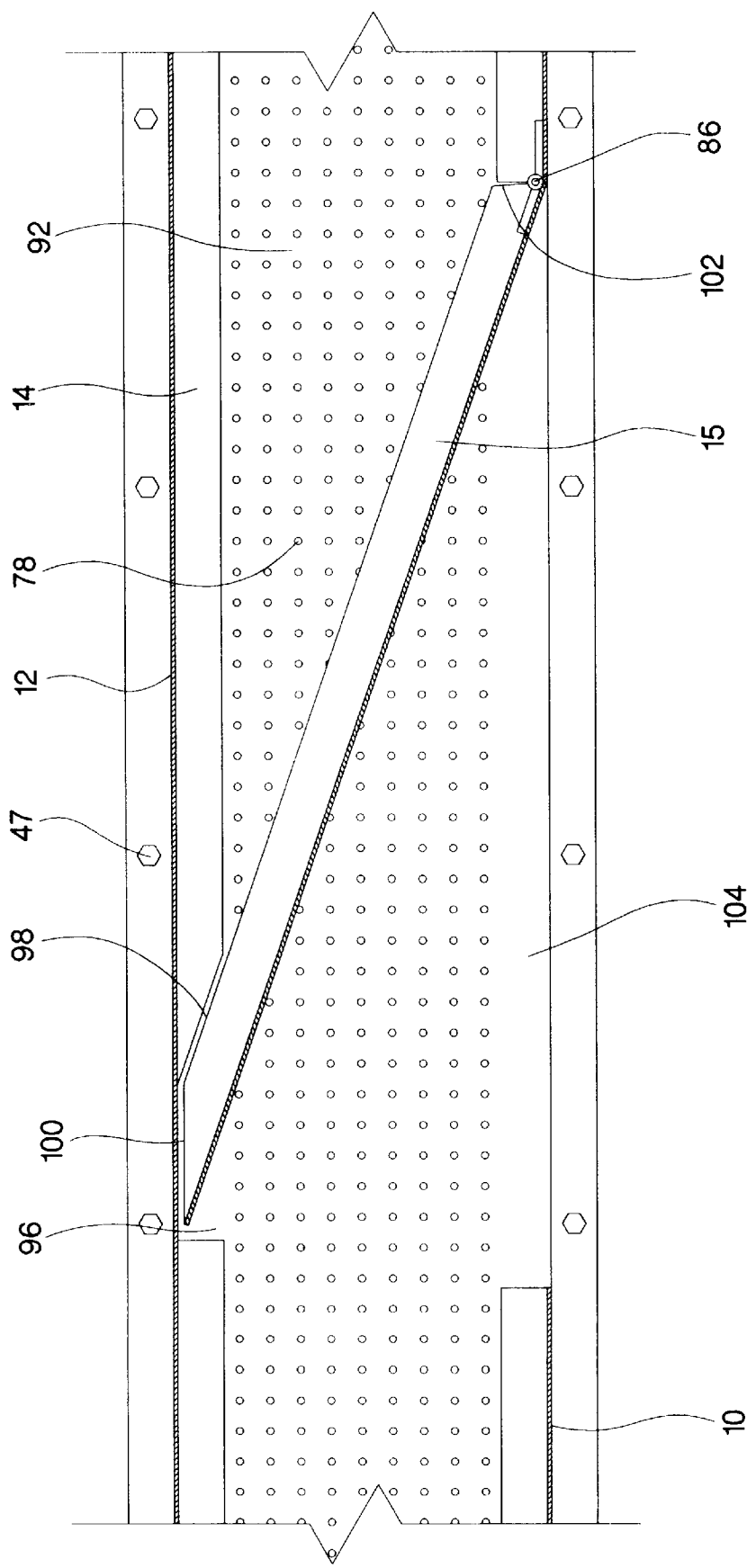
FIG. 8 is identical to FIG. 7, except showing an alternate positioning of the side discharge door.
Figure 9:
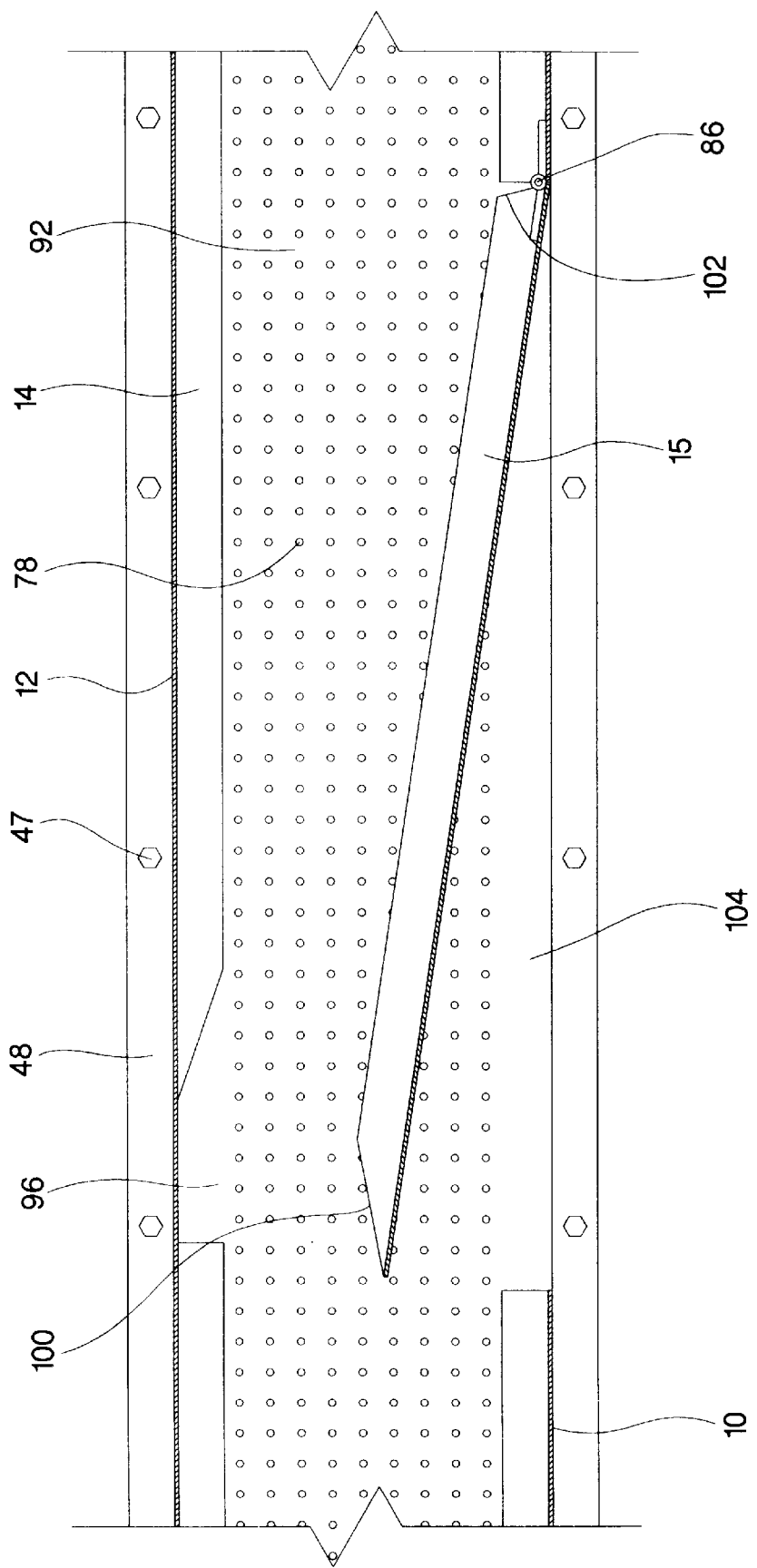
FIG. 9 is identical to FIG. 7, except showing a second alternate position of the side discharge door.

Referring simultaneously to FIGS. 1, 5, and 8, each segment of the air cushioned belt conveyor 1 may include a side discharge door 50 allowing grain 90 to be selectively discharged sideways from the conveyor rather than out of the forward output port 64. The side discharge doors 50 are pivotally mounted upon the side walls 10 or 12 of the conveyor 1 by means of hinges 86. As the side discharge doors 50 pivotally swing inwardly into the channel 84, their edge covering flanges 15 swing over the upper surface of the belt 16, and the rearward ends of the flanges 15 swing into recesses 96 within the opposing flange 14. The forward and rearward ends of the door flanges 15 have beveled surfaces 100 and 102. Similarly, the forward ends of the recesses 96 have beveled surfaces 98. Bevels 102, 100, and 98 allow the rearward ends of the side discharge doors 50 to come into close proximity with the interior surface of the side walls 10 or 12, allowing complete sideways diversion of the grain 90. Pivotal motion of each side discharge door 50 about the hinge 86 is induced by rotational torque applied to axles 88. Lever arms 20 for applying such torque to the axles 88 are fixedly attached to the upper ends of the axles 88 by means of, referring to FIG. 6, a fixedly welded pin 19. Referring simultaneously to FIGS. 1, 5, and 8, door actuator arms 11 are pivotally attached. to the opposing end of the lever arms 20 by means of pins 21; the opposite ends of the actuator arms 11 being driven in selective reciprocating motion by an electric actuator motor 8 supported by an actuator bracket 9. As depicted in FIGS. 1, 5, and 8, operation of the electrical actuator motor 8 to extend the actuator arm 11 turns the lever 20 in a clockwise motion, rotating the axle 88 clockwise, causing the side discharge door 50 to swing across the channel 84 and into the opposing recess 96.

Referring simultaneously to FIGS. 1 and 5, an air blower, not shown, preferably driven by an electric motor is utilized to force air into a main air tube 24. Serving each segment of the conveyor, a lateral air line 26 extends from the main air tube 24. Through the lateral air lines 26, air freely flows into and through air tubes 28 which serve, referring to FIG. 3, the air induction ports 74 of the lower air chamber 68. Referring again to FIGS. 1 and 5, air from the lateral air lines 26 also flows into the larger air induction tubes 66. Referring to FIG. 3, air from the air induction tubes 66 flows through air induction ports 76, and referring to FIG. 5, thence into the interior spaces 82 of the segmented air chambers 80. Thence, the air passes upwardly through the air cushion apertures 78, forming a thin layer of pressurized air 93 providing friction free support of the forward path of the belt 16. Air emanating from the air tubes 28 into the interior space of the lower air chamber 68 similarly passes upwardly through air cushion apertures 70 forming a thin layer of pressurized air 71 for frictionless support of the belt on its return path 18.

Referring to FIG. 1, the conveyor has a pair of rearward belt rollers 42 and a pair of forward belt rollers 56; the rearward belt rollers 42 being supported by a rear housing 44, and the forward belt rollers being supported by a forward housing 52. The forward rollers preferably are powered by an electric motor 54, which utilizes a belt drive 58, turning a pulley 60, and power transfer gears 62. Rotational torque supplied by the electric motor 54 provides a belt driving force for continuously moving the belt through its circuit including the upper forward conveying path 16 and the lower rearward return path 18. The rear housing 44 rotatably supports a tensioning roller 36 which may be moved rearwardly or forwardly by a screw tightener 38 for tightening or loosening the belt 16 and 18.

Referring further to FIG. 1, electric current powering the conveyor is supplied through an electric power cord 40, the current being controlled within an electric switching box 34, whose switches in turn, referring to FIGS. 1 and 4, control and supply electric power to the control elements of the conveyor through electric cables 3, the cables being encased within an electrical conduit 2. The conduit 2 preferably is mounted and supported on the upper wall 4 of the conveyor 1 by means of a support brackets 6, the support brackets having a U-bolts 5, and being affixed to the upper wall 4 by means of nuts and bolts 13. Actuator arm control electric lines 7 extend laterally from the electric conduit 2 to each of the electric arm actuators 8. Finally, the electric cables 3 extend to and electrically power the electric motor 54.

In operation, referring to FIG. 1, where dry bulk material such as grain, is to be conveyed from the input port 46 to the output port 64, an electric motor driven blower, not shown, is operated to force air into the main air tube 24; and controls on the switch box 34 are manipulated to activate the electric motor 54, causing the conveyor belt 16 and 18 to begin to move. All electric arm actuators 8 are operated to retract, closing all side discharge doors 50. Referring simultaneously to FIGS. 1 and 4, grain 90 poured into the input port 46 flows forwardly along the channel 84 while being supported by the forward path of the belt 16. Side flanges 15 and 14 prevent the grain from coming into contact with the sides of the belt 16, keeping the grain from encroaching into the air cushion space 93 between the belt 16 and the belt support floor 92. With all side discharge doors 50 closed, air cushioned and friction-free conveyance of grain is provided from the input port 46 to the output port 64.

Referring simultaneously to FIGS. 1 and 5, all of the grain 90 may be diverted out of a side discharge doorway by selectively operating an electric arm actuator 8 to extend its door actuator arm 11, causing clockwise motion of a lever arm 20 and axle 88, causing its side discharge door 50 to swing across and block the channel 84.

Referring simultaneously to FIGS. 4 and 5, the air cushion gap 93 underlying a loaded section of the conveyor is much thinner than the air cushion gap 99 underlying an unloaded section of the conveyor. The heightened air gap 99 acts as a pressure relief, reducing air pressure within segmented chamber spaces 82 underlying unloaded sections of the chamber. Referring to FIG. 3, the partitions 72 prevent such pressure relieving effect from relieving air pressure within chamber spaces 82 underlying loaded sections of the conveyor. In absence of such partitions 72 the air pressure necessary to create an air cushion gap along loaded sections of the conveyor typically causes excessive upwelling of the belt 16 along unloaded sections. The partitions 72 creating segmented spaces 82 allow lower air pressure to be utilized along the full length of the conveyor providing a cushioning air gap along loaded sections, and preventing excessive upwelling along unloaded sections.

Figure 10:
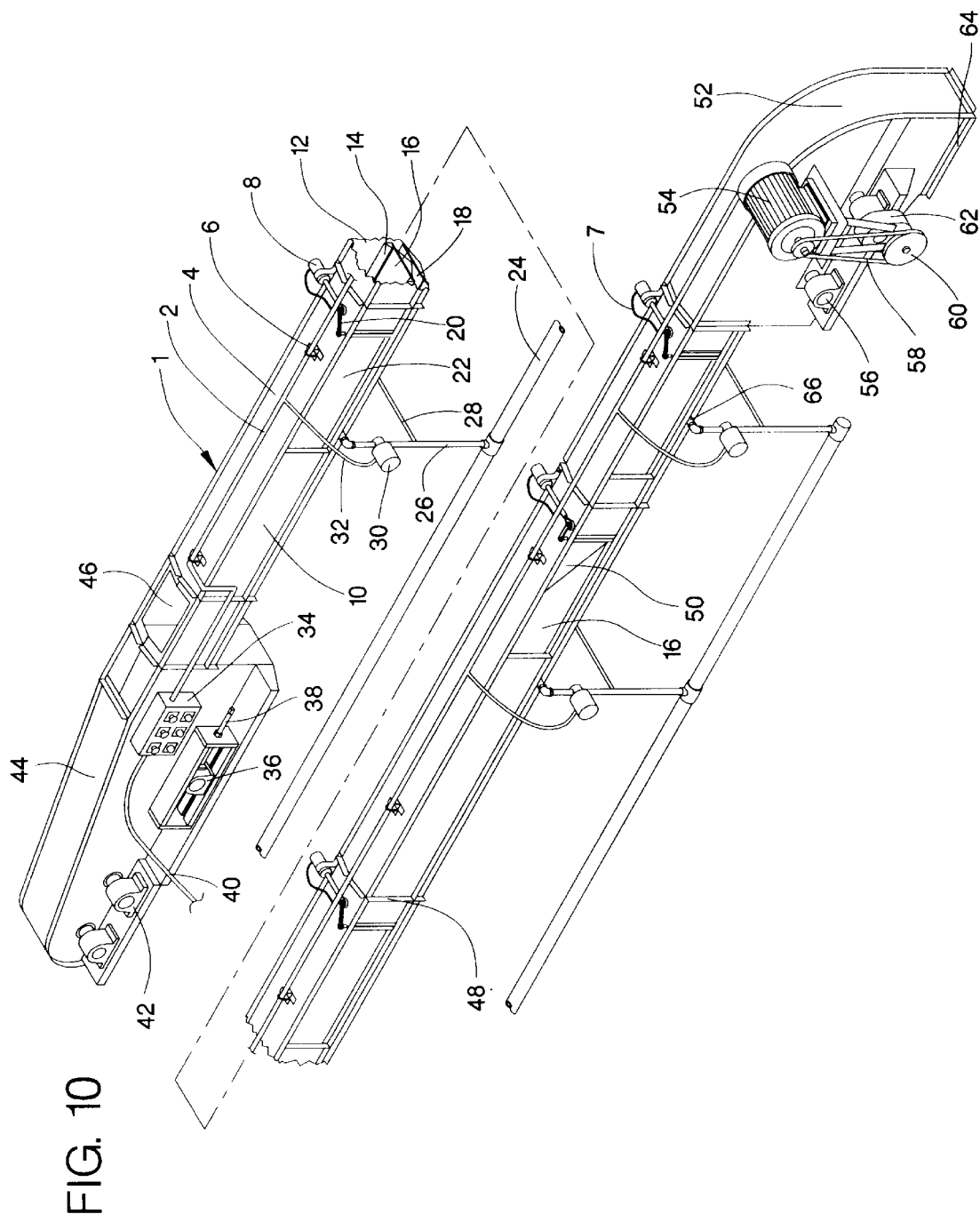
FIG. 10 is an alternate view of FIG. 1, incorporating air control valves.

Referring to FIG. 10, where heavy material is conveyed, and where the belt 16 is highly flexible along its lateral dimension, excessive upwelling may occur along unloaded sections of the conveyor notwithstanding, referring to FIG. 3, the partitions 72 between the chamber spaces 82. To control such excessive upwelling, referring to FIG. 10, electric solenoid actuated air valves 30 may be installed upon the air induction tubes 66, the air valves 30 being remotely electronically operatable through electric wires 32 controlled from the electric switching box 34.

Figure 6:
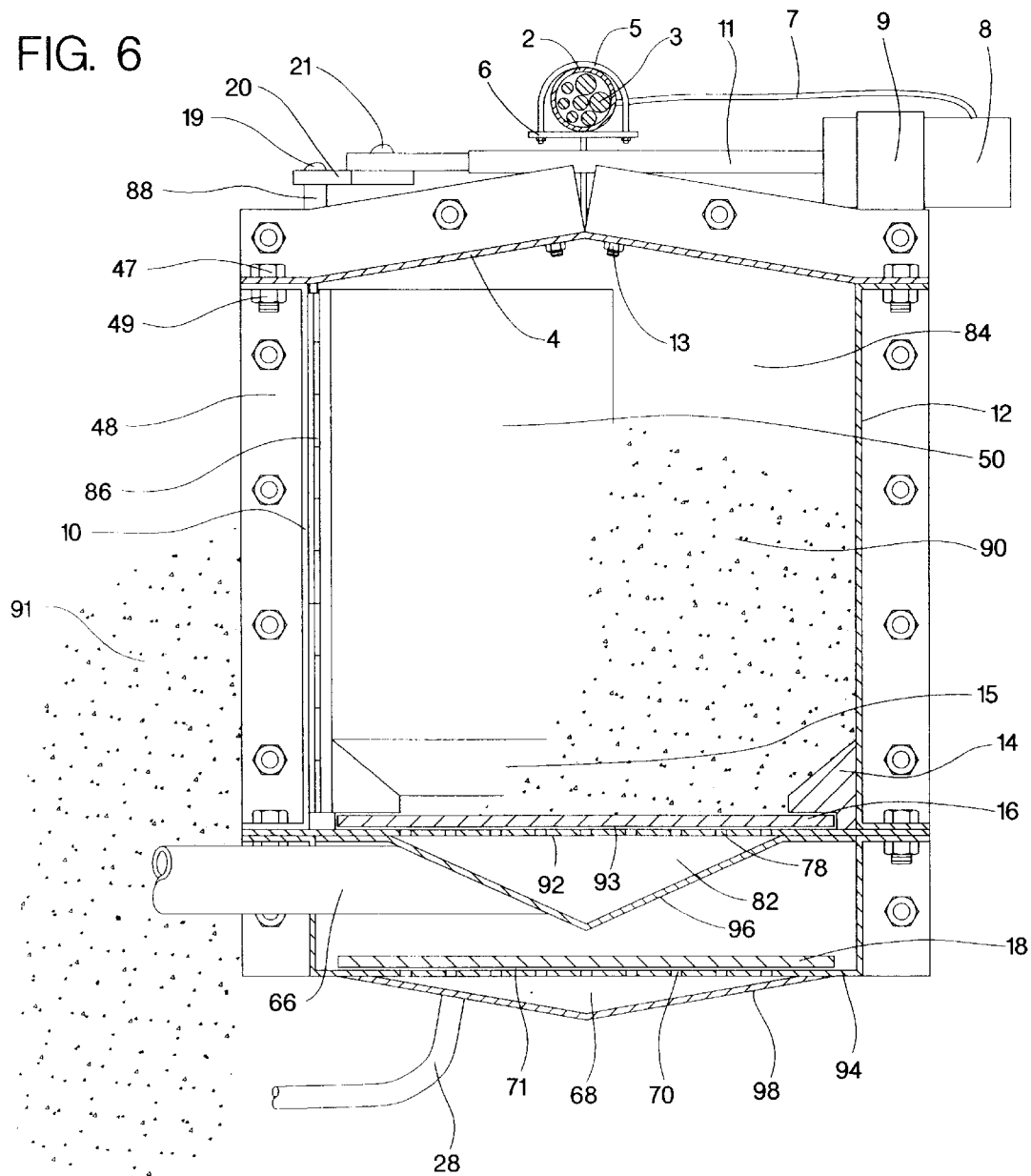
FIG. 6 is identical to FIG. 4, except showing a second alternate position of the side discharge door.

Referring to FIG. 6, it may be desireable to cause only a portion of the grain 90 to discharge sideways. In order to do so, an electric arm actuator 8 is operated to place its actuator arm 11 at a position midway between its fully extended and fully retracted positions, causing its side discharge door 50 to swing to a position partially blocking the channel 84. Upon such positioning of a side discharge door 50, a portion of the grain 91 discharges sideways while the remaining portion of the grain 90 continues its path along the conveyor.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. A material conveyor having a right side, a left side, an upper end, a lower end, a forward end, and having a rearward end, the material conveyor comprising:

(A) a belt supporting floor, having a substantially continuous upper surface, a lower surface, a right side, a left side, a width, a forward end, and having a rearward end, the belt supporting floor having a multiplicity of air cushion apertures therethrough, each such aperture extending from the upper surface of the belt supporting floor to its lower surface;

(B) a walled chamber fixedly attached to the material conveyor, the walled chamber having an interior space, an upper wall, a lower end, a forward end, a rearward end, a right side, and having a left side, the upper wall of the walled chamber comprising the belt supporting floor, the walled chamber having a plurality of air dividing partitions fixedly attached thereto and extending across its internal space from its right side to its left side, the air dividing partitions dividing the internal space of the walled chamber into a plurality of air pressure control chambers;

(C) air induction means, the air induction means being fixedly attached to the material conveyor, and being capable of injecting pressurized air into the air pressure control chambers;

(D) a continuous loop conveyor belt, the continuous loop conveyor belt having a width, a right side, a left side, an interior surface, and having an exterior surface, the continuous loop conveyor belt being substantially air impermeable, the continuous loop conveyor belt being mounted upon the material conveyor so that a portion of the continuous loop conveyor belt's interior surface is in slidable contact with the upper surface of the belt supporting floor, the width of the continuous loop conveyor belt being substantially co-extensive with the width of the belt supporting floor; and, (E) belt driving means fixedly mounted upon the material conveyor, the belt driving means being capable of driving the continuous loop conveyor belt so that portions of its interior surface may slide forwardly along the upper surface of the belt supporting floor for conveying materials resting on the opposing exterior surface of the continuous loop conveyor belt.

2. The material conveyor of claim No. 1 further comprising a left material retaining wall and a right material retaining wall, the left and right material retaining walls being respectively fixedly mounted upon the left and right sides of the material conveyor, the left and right material retaining walls being respectively capable of preventing materials conveyed by the continuous loop conveyor belt from moving leftwardly or rightwardly away from the left and right sides of the continuous loop conveyor belt.

3. The material conveyor of claim No. 2, further comprising side discharging means fixedly attached to the material conveyor, the side discharging means being capable of selectively diverting leftwardly or rightwardly materials conveyed by the continuous loop conveyor belt.

4. The material conveyor of claim No. 3, further comprising a belt return floor having an upper surface, a lower surface, a right side, a left side, a forward end, a rearward end, and having a second multiplicity of air cushion apertures therethrough, each such aperture extending from the upper surface of the belt return floor to its lower surface; return floor suspending means fixedly attached to the material conveyor, the return floor suspending means being capable of fixedly suspending and positioning the belt return floor below the lower end of the walled chamber, the return floor suspending means so fixedly suspending and positioning the belt return floor; and a second walled chamber fixedly attached to the material conveyor, the second walled chamber having an interior space, a second upper wall, a lower end, a forward end, a rearward end, a right side, and having a left side, the second upper wall comprising the belt return floor; wherein, the air induction means is further capable of injecting pressurized air into the interior space of the second walled chamber; and wherein the continuous loop conveyor belt is further mounted upon the material conveyor so that a portion of the continuous loop conveyor belt's exterior surface is in slidable contact with the upper surface of the belt return floor.

5. The material conveyor of claim No. 4, further comprising a third upper wall fixedly attached to and spanning between the upper ends of the left and right material retaining walls, the third upper wall, the left and right material retaining walls, and the belt supporting floor defining a material conveying channel; wherein the left or right material retaining walls have a plurality of side discharge apertures therethrough; and wherein the side discharging means comprises a plurality of side discharge doors, each door having a forward end, and a rearward end, each such door being pivotally attached to the material conveyor so that it may pivot from a first position wherein it closes a side discharge aperture to second positions wherein one of its ends extends at an acute angle with respect to the material conveying channel for diverting materials conveyed by the continuous loop conveyor belt out of the side discharge aperture.

6. The material conveyor of claim No. 5, wherein the second walled chamber and the air pressure control chambers each have an air induction port; and wherein the air induction means comprises an air line having an air input end and a plurality of branched air output ends, the air output ends of the air line being fixedly attached to the air induction ports.

7. The material conveyor of claim No. 6, further comprising a plurality of air control valves fixedly attached to and being capable of controlling air flow within the branches of the air line the air output ends of which are attached to the air induction ports of the air pressure control chambers.

8. The material conveyor of claim No. 7, further comprising a plurality of forward rollers rotatably mounted upon the material conveyor at its forward end, and a plurality of rearward rollers rotatably mounted upon the material conveyor at its rearward end, the forward and rearward rollers being positioned and aligned thereon so that their exterior radial surfaces are in rollable contact with the continuous loop conveyor belt; and wherein the belt driving means comprises an belt driving electric motor having a power transmitting means capable of transferring rotational torque to one of the forward or rearward rollers.

9. The material conveyor of claim No. 8, further comprising a door opening and closing means fixedly attached to the material conveyor; the door opening and closing means being capable of selectively pivoting the side discharge doors between their first and second positions.

10. The material conveyor of claim No. 9, wherein the door opening and closing means comprises a plurality of hinges fixedly attached to the forward or rearward ends of the side discharge doors, a plurality of pivot shafts fixedly attached to and upwardly extending from the upper ends of the hinges, a plurality of lever arms, an end of each of which being fixedly attached to the upper end of each of the pivot shafts, and a plurality of actuator shafts pivotally attached to the opposite ends of the lever arms.

11. The material conveyor of claim No. 10, further comprising a left and a right belt edge covering flange, such flanges being respectively fixedly attached to the interior surfaces of the left and right material retaining walls; and being positioned thereon so that they may respectively overlie and shield the left and right edges of the continuous loop conveyor belt.

12. The material conveyor of claim No. 11, wherein the lower ends of the left and right material retaining walls extend downwardly to an elevation below the elevation of the lower end of the walled chamber; and wherein the return floor suspending means comprises such downward extensions of the left and right material retaining walls.

13. The material conveyor of claim No. 12, wherein the air induction means further comprises an air blower fixedly attached to the air input end of the air line.

14. The material conveyor of claim No. 13, further comprising a plurality of electric solenoids mounted upon the air control valves, the electric solenoids being capable of selectively opening and closing such valves.

15. The material conveyor of claim No. 14, further comprising a plurality of actuator shaft driving motors fixedly mounted upon the material conveyor, such motors being capable of selectively extending and retracting the actuator shafts for opening and closing the side discharge doors.

16. A material conveyor having a right side, a left side, an upper end, a lower end, a forward end, and having a rearward end, the material conveyor comprising:

(A) a belt supporting floor, having an upper surface, a lower surface, a right side, a left side, a forward end, and having a rearward end, the belt supporting floor having a multiplicity of air cushion apertures therethrough, each such aperture extending from the upper surface of the belt supporting floor to its lower surface;

(B) a walled chamber fixedly attached to the material conveyor, the walled chamber having an interior space, an upper wall, a lower end, a forward end, a rearward end, a right side, and having a left side, the upper wall of the walled chamber comprising the belt supporting floor, the walled chamber having a plurality of air dividing partitions fixedly attached thereto and extending across its internal space from its right side to its left side, the air dividing partitions dividing the internal space of the walled chamber into a plurality of air pressure control chambers;

(C) air induction means, the air induction means being fixedly attached to the material conveyor, and being capable of injecting pressurized air into the air pressure control chambers;

(D) a continuous loop conveyor belt, the continuous loop conveyor belt having a right side, a left side, an interior surface, and having an exterior surface, the continuous loop conveyor belt being mounted upon the material conveyor so that a portion of the continuous loop conveyor belt's interior surface is in slidable contact with the upper surface of the belt supporting floor;

(E) belt driving means fixedly mounted upon the material conveyor, the belt driving means being capable of driving the continuous loop conveyor belt so that portions of its interior surface may slide forwardly along the upper surface of the belt supporting floor for conveying materials resting on the opposing exterior surface of the continuous loop conveyor belt;

(F) left material retaining wall and a right material retaining wall, the left and right material retaining walls being respectively fixedly mounted upon the left and right sides of the material conveyor, the left and right material retaining walls being respectively capable of preventing materials conveyed by the continuous loop conveyor belt from moving leftwardly or rightwardly away from the left and right sides of the continuous loop conveyor belt;

(G) side discharging means fixedly attached to the material conveyor, the side discharging means being capable of selectively diverting leftwardly or rightwardly materials conveyed by the continuous loop conveyor belt;

(H) a belt return floor having an upper surface, a lower surface, a right side, a left side, a forward end, a rearward end, and having a second multiplicity of air cushion apertures therethrough, each such aperture extending from the upper surface of the belt return floor to its lower surface;

(I) return floor suspending means fixedly attached to the material conveyor, the return floor suspending means being capable of fixedly suspending and positioning the belt return floor below the lower end of the walled chamber, the return floor suspending means so fixedly suspending and positioning the belt return floor; and (J) a second walled chamber fixedly attached to the material conveyor, the second walled chamber having an interior space, a second upper wall, a lower end, a forward end, a rearward end, a right side, and having a left side, the second upper wall comprising the belt return floor; wherein, the air induction means is further capable of injecting pressurized air into the interior space of the second walled chamber; and wherein the continuous loop conveyor belt is further mounted upon the material conveyor so that a portion of the continuous loop conveyor belt's exterior surface is in slidable contact with the upper surface of the belt return floor.

17. The material conveyor of claim No. 16, further comprising a third upper wall fixedly attached to and spanning between the upper ends of the left and right material retaining walls, the third upper wall, the left and right material retaining walls, and the belt supporting floor defining a material conveying channel; wherein the left or right material retaining walls have a plurality of side discharge apertures therethrough; and wherein the side discharging means comprises a plurality of side discharge doors, each door having a forward end, and a rearward end, each such door being pivotally attached to the material conveyor so that it may pivot from a first position wherein it closes a side discharge aperture to second positions wherein one of its ends extends at an acute angle with respect to the material conveying channel for diverting materials conveyed by the continuous loop conveyor belt out of the side discharge aperture.

18. The material conveyor of claim No. 17, wherein the second walled chamber and the air pressure control chambers each have an air induction port; and wherein the air induction means comprises an air line having an air input end and a plurality of branched air output ends, the air output ends of the air line being fixedly attached to the air induction ports.

19. The material conveyor of claim No. 18, further comprising a plurality of air control valves fixedly attached to and being capable of controlling air flow within the branches of the air line the air output ends of which are attached to the air induction ports of the air pressure control chambers.

20. The material conveyor of claim No. 19, further comprising a plurality of forward rollers rotatably mounted upon the material conveyor at its forward end, and a plurality of rearward rollers rotatably mounted upon the material conveyor at its rearward end, the forward and rearward rollers being positioned and aligned thereon so that their exterior radial surfaces are in rollable contact with the continuous loop conveyor belt; and wherein the belt driving means comprises an belt driving electric motor having a power transmitting means capable of transferring rotational torque to one of the forward or rearward rollers.

21. The material conveyor of claim No. 20, further comprising a door opening and closing means fixedly attached to the material conveyor; the door opening and closing means being capable of selectively pivoting the side discharge doors between their first and second positions.

22. The material conveyor of claim No. 21, wherein the door opening and closing means comprises a plurality of hinges fixedly attached to the forward or rearward ends of the side discharge doors, a plurality of pivot shafts fixedly attached to and upwardly extending from the upper ends of the hinges, a plurality of lever arms, an end of each of which being fixedly attached to the upper end of each of the pivot shafts, and a plurality of actuator shafts pivotally attached to the opposite ends of the lever arms.

23. The material conveyor of claim No. 22, further comprising a left and a right belt edge covering flange, such flanges being respectively fixedly attached to the interior surfaces of the left and right material retaining walls; and being positioned thereon so that they may respectively overlie and shield the left and right edges of the continuous loop conveyor belt.

24. The material conveyor of claim No. 23, wherein the lower ends of the left and right material retaining walls extend downwardly to an elevation below the elevation of the lower end of the walled chamber; and wherein the return floor suspending means comprises such downward extensions of the left and right material retaining walls.

25. The material conveyor of claim No. 24, wherein the air induction means further comprises an air blower fixedly attached to the air input end of the air line.

26. The material conveyor of claim No. 25, further comprising a plurality of electric solenoids mounted upon the air control valves, the electric solenoids being capable of selectively opening and closing such valves.

27. The material conveyor of claim No. 26, further comprising a plurality of actuator shaft driving motors fixedly mounted upon the material conveyor, such motors being capable of selectively extending and retracting the actuator shafts for opening and closing the side discharge doors.

* * * * *